Patented Dec. 10, 1946

2,412,470

UNITED STATES PATENT OFFICE 2,412,470

PRODUCTION OF WATER-REPELLENT MATERIALS

Francis J. Norton, Schenectady, N. Y., assignor to General Electric Company, a corporation of New York No Drawing. Application February 22, 1943, Serial No. 476,767

8 Claims. (Cl. 117—106)

The present invention is concerned with the production of water-repellent materials by treating solid materials which normally are water-non-repellent with a composition containing, as the active or essential ingredient, a mixture of trimethyl silicon chloride and silicon tetrachloride.

Patent 2,306,222 issued to Winton I. Patnode describes and claims water-repellent materials and a method of rendering materials water-repellent which broadly comprises contacting a water-non-repellent body with an organo-silicon halide or mixtures of organo-silicon halides in vapor form.

The present invention is based on my discovery that although pure silicon tetrachloride does not by itself confer water-repellent properties to surfaces treated therewith and, of all of the known organo-silicon halides, pure trimethyl silicon chloride is probably the least effective in so far as this property is concerned, compositions containing both of these chlorosilanes do confer excellent water repellency to surfaces brought into contact therewith.

The mixtures of trimethyl silicon chloride and silicon tetrachloride may be used in vapor form, liquid form, or in the form of solutions in an inert solvent.

On a weight per cent basis, mixtures of these two compounds containing from about 2.8 per cent trimethyl silicon chloride and 97.2 per cent silicon tetrachloride to about 99.2 per cent trimethyl silicon chloride and 0.8 per cent silicon tetrachloride have been found to possess the property of conferring water-repellency to surfaces of water-non-repellent materials treated therewith. Compositions substantially outside the above specified range do not possess this property. I prefer to employ azeotropic mixtures in the region of 50 mol per cent of each of the two compounds, particularly in the vapor treatment of water-non-repellent bodies. Mixtures of this type have the advantage of being constant boiling mixtures, the compositions of which are substantially unchanged on vaporization. Thus various methods may be used in applying them to a water-non-repellent body. For example, such mixtures may be distilled into a treating chamber containing the bodies to be treated or may be conveyed to the chamber by a stream of air or inert gas bubbling through the liquid mixture. They may also be evaporated into the treating chamber at a reduced pressure for unlike many azeotropes, mixtures of silicon tetrachloride and trimethyl silicon chloride do not show any substantial change in composition on distillation at reduced pressures. At 760 mm. pressure the difference between the boiling points of the two materials in the pure state is only 0.1° C. Although there is a difference of about 17° C. at 100 mm. pressure, the azeotropic mixtures do not appear to be broken merely by distillation at such reduced pressures. In some cases slight changes in the original composition of mixtures distilled at reduced pressures have been noted, but the composition of the products are still within the region of 50 mol per cent of each compound or, more specifically, between 45 to 55 mol per cent trimethyl silicon chloride and 55 to 45 mol per cent silicon tetrachloride. My preferred mixtures are those falling within this range which contain on a weight per cent basis, from 34.5 to 44 per cent trimethyl silicon chloride and 65.5 to 56 per cent silicon tetrachloride.

The above described mixtures of trimethyl silicon chloride and silicon tetrachloride have been found to impart water-repellent properties to all water-non-repellent solid bodies treated therewith. Numerous examples of such bodies are given in the above mentioned Patnode Patent 2,306,222 and include metals, glass and other ceramic or porcelain bodies, mica, asbestos, solid organic materials, particularly cellulosic materials such as wood and Cellophane, and organic fibrous materials such as paper, cotton, linen, silk, wool, synthetic fibers such as linear condensation polyamides, etc. in fiber, fabric or sheet form. In many applications, as for example in the case of organic materials which may be detrimentally affected by halogen acids, the treated body is preferably brought into contact with an alkaline reagent, such as ammonia, as is described more fully in the above-mentioned Patnode patent for the purpose of neutralizing any free acid present as a result of the treatment with the trimethyl silicon chloride-silicon tetrachloride composition.

The exact nature of the invisible hydrophobic coating formed as a result of my treatment is not known. A possible theoretical explanation is that the unhydrolyzed silicon chlorides react with moisture present on the surface of the body undergoing treatment to form a hydrophobic silicol or silicone coating. At least, it is known that best results are obtained when the treatment is carried out in a relatively humid atmosphere for example, in an atmosphere having a relative humidity of at least 10 per cent and preferably between 30 and 99 per cent, or, when the bodies to be treated have been stored for a period of time in such an atmosphere just prior to the treatment with the silicon chloride mixture. However, practical results appear to indicate that this explanation based on the possible formation of silicols or silicones is not fully adequate since the treatment of water-non-repellent bodies with equivalent concentrations of a silicol or silicone obtained by hydrolyzing a given organo-silicon chloride mixture does not result in the formation of a hydrophobic surface coating until or unless a definitely visible resinous and sealing coat is formed. It would seem therefore that the reactions involved in the formation of the water-repellent coating from the silicon chloride mixtures are rather complex and may also include the formation of a chemical compound between the silicon chlorides or the corresponding silicols and the material being treated, particularly in the case of cellulosic materials or ceramic bodies.

In general, I prefer the vapor method of treating water-non-repellent bodies because it is both rapid and economical. However, similar results may be obtained by bringing the body to be treated into direct contact with a liquid mixture of the designated compounds or with a solution thereof in an inert solvent such as an ether, or a liquid hydrocarbon or chlorinated hydrocarbon which is unreactive toward the silicon chlorides and is inactive in so far as the water-repellent action is concerned. In fact, the liquid treatment, particularly that involving the use of dilute solutions of the silicon chloride mixtures may be found to be the most desirable for treating thick porous bodies such as porous silica brick, heavy woolens, etc.

The compositions used in the practice of my invention may consist essentially of a mixture of the pure individual components in the desired proportions or may consist of azeotropic mixtures of the two compounds which are recovered at about 54.5° C. at 760 mm. pressure during the fractional distillation of the reaction products obtained by reacting methyl chloride with silicon in the presence of copper as described in the copending applications of Eugene G. Rochow, S. N. 412,459 and Eugene G. Rochow and Winton I. Patnode, S. N. 412,460, said applications having issued on August 7, 1945, as U. S. Patents 2,380,995 and 2,380,996, respectively. Both of these aplications were filed September 26, 1941 and are assigned to the same assignee as the present invention. These azeotropic fractions which consist substantially of trimethyl silicon chloride and silicon tetrachloride ordinarily contain small amounts of other reaction products boiling immediately below and above the boiling point of the azeotrope. Examples of the higher or lower boiling products which may be present in the azeotropic fraction are methyl silicon dichloride, $CH_3SiHCl_2$, boiling at about 41° C. and methyl silicon trichloride boiling at about 66° C. at 760 mm. pressure.

From the above description it is obvious that I contemplate the use of various mixtures of trimethyl silicon chloride and silicon tetrachloride in vapor or liquid form or in the form of a solution in the practice of my invention. In any one of the three states, the trimethyl silicon chloride and the silicon tetrachloride are the essential active ingredients of the treating compositions although not necessarily the only ingredients. For example, in the case of impure azeotropic mixtures of these two compounds, other active but unessential silicon chlorides may be present in small amounts while in the case of solutions of the two compounds, an inert or inactive solvent is present. As the presence of such materials is clearly within the scope of my invention, my treating compositions broadly may be described as containing, as the essential active ingredients, a mixture of chlorosilanes consisting substantially of trimethyl silicon chloride and silicon tetrachloride in the designated proportions.

What I claim as new and desire to secure by Letters Patent of the United States is:

1. The process of treating a solid body to render it water-repellent which comprises contacting said body with a composition containing, as the active ingredient thereof, a mixture consisting substantially of from about 2.8 to 99.2 per cent by weight of trimethyl silicon chloride and about 97.2 to 0.8 per cent by weight of silicon tetrachloride based on the weight of the mixture.

2. The method of treating solid bodies to render them resistant to aqueous liquids which comprises bringing such body to be treated into contact with a composition containing as the active ingredient, a mixture of chlorosilanes consisting substantially of from about 45 to 55 mol per cent trimethyl silicon chloride, 45 to 55 mol per cent of silicon tetrachloride.

3. The process which comprises the steps of first contacting a solid body that is to be rendered water-repellent with the vapors of a mixture of from about 2.8 to 99.2 per cent by weight of trimethyl silicon chloride and about 97.2 to 0.8 per cent by weight of silicon tetrachloride and thereafter contacting the thus treated body with the vapors of an alkaline reagent.

4. The process which comprises the steps of first contacting a solid body that is to be rendered water-repellent with vapors of an azeotropic mixture of trimethyl silicon chloride and silicon tetrachloride and thereafter contacting the thus treated body with ammonia in vapor form.

5. The process of treating a solid body to render it water-repellent which comprises contacting said body with the vapors of a composition consisting substantially of a mixture of from about 2.8 to 99.2 per cent by weight of trimethyl silicon chloride and about 97.2 to 0.8 per cent by weight of silicon tetrachloride in an atmosphere having a relative humidity of from 30 to 99 per cent.

6. The process of waterproofing organic fibrous materials which comprises treating the materials with a composition consisting substantially of a mixture of from 45 to 55 mol per cent trimethyl silicon chloride and 55 to 45 mol per cent silicon tetrachloride.

7. The process of treating paper which comprises contacting the paper with a composition consisting substantially of an azeotrope of trimethyl silicon chloride and silicon tetrachloride.

8. The process of making ceramic bodies not-wettable by water which comprises treating the bodies with a composition consisting substantially of an azeotropic mixture of trimethyl silicon chloride and silicon tetrachloride.

FRANCIS J. NORTON.